(12) United States Patent
Shimo

(10) Patent No.: US 6,282,035 B1
(45) Date of Patent: Aug. 28, 2001

(54) IMAGE FORMING OPTICAL SYSTEM IN WHICH THE EFFECTS OF GHOSTING ARE MINIMIZED

(75) Inventor: Mituaki Shimo, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/419,326

(22) Filed: Oct. 15, 1999

(30) Foreign Application Priority Data

Oct. 15, 1998 (JP) .................................................. 10-293334

(51) Int. Cl.⁷ .................................................. G02B 27/02
(52) U.S. Cl. ........................... 359/798; 359/800; 359/799
(58) Field of Search .................................. 359/618, 629, 359/798, 799, 800, 801

(56) References Cited

U.S. PATENT DOCUMENTS 3,926,500 * 12/1975 Frosch et al. .......................... 359/235
5,743,612   4/1998 Matsuda et al. ........................ 353/97

FOREIGN PATENT DOCUMENTS 8-327966   12/1966  (JP) .
4-194921    7/1992  (JP) .

* cited by examiner

Primary Examiner—Ricky Mack
(74) Attorney, Agent, or Firm—Sidley & Austin

(57) ABSTRACT

An image forming optical system minimizes the effects of ghosts in an image. In one embodiment of the present invention, light is at an intermediate point of the optical system. Introducing light in this manner can result in ghosts being produced in the imaged data or in data being missing from the imaged data, both of which are undesirable conditions. The present invention minimizes ghosting and loss of data by maintaining one or more optical relationships to within set ranges.

12 Claims, 4 Drawing Sheets

FNO=5.6

——— d
---- SC

-1.0    1.0
SPHERICAL ABERRATION
AND SINE CONDITION

Y'=11.5

---- DM
——— DS

-1.0    1.0
ASTIGMATISM

Y'=11.5

-1.0    1.0
% DISTORTION

FNO=5.6
—— d
---- SC
-1.0   1.0
SPHERICAL ABERRATION
AND SINE CONDITION

Y'=11.5
---- DM
—— DS
-1.0   1.0
ASTIGMATISM

Y'=11.5
-1.0   1.0
% DISTORTION

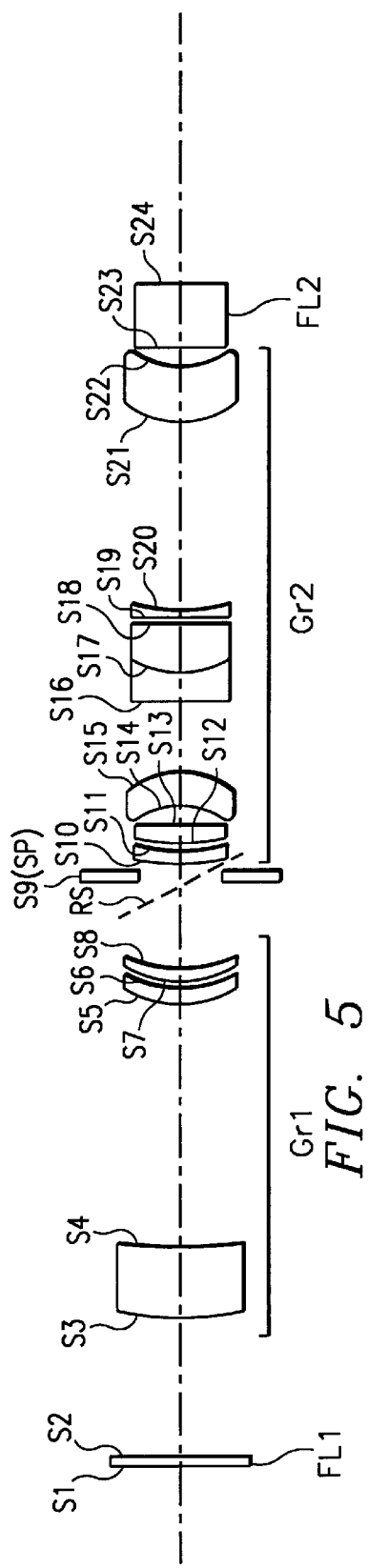
FIG. 5
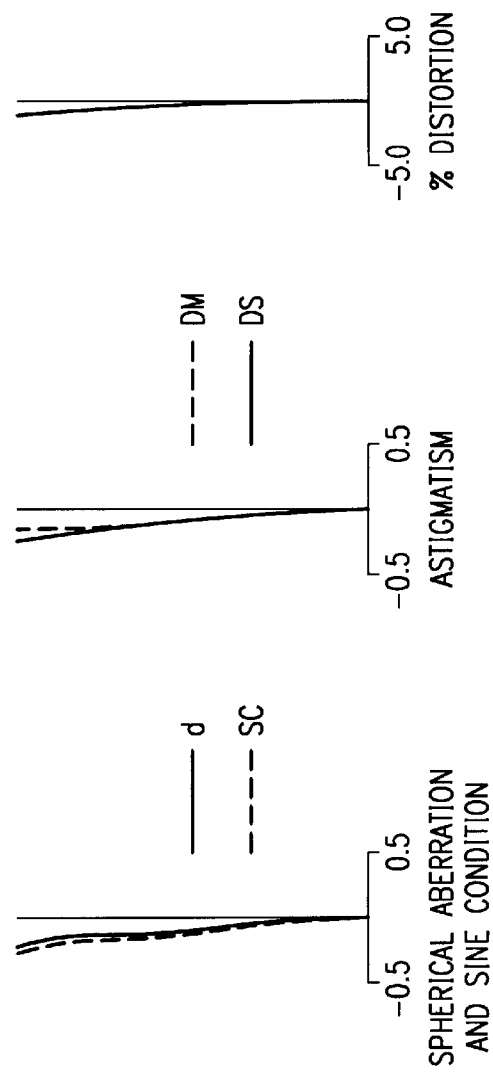
FIG. 6(a)
FIG. 6(b)
FIG. 6(c)

IMAGE FORMING OPTICAL SYSTEM IN WHICH THE EFFECTS OF GHOSTING ARE MINIMIZED

This application is based on Japanese Application No. 10-293334, the content of which is hereby incorporated by reference.

FIELD OF THE INVENTION

The present invention is directed generally to an image forming optical system, and, in one aspect, to an image forming optical system for reading and inspection which minimizes the effects of ghosting in an image.

BACKGROUND OF THE INVENTION

In order to read or inspect an object which is imaged by an image forming optical system, it is necessary to illuminate the object. An illuminating optical system is typically constructed as a separate system from the image forming optical system; however, by employing a structure which introduces illuminating light at an intermediate point of the image forming optical system, the overall size of the apparatus can be reduced. Referring to FIG. 7, illuminating light 70 is introduced at an intermediate point of an image forming optical system from a light source 72. The illuminating light 70 is reflected by a reflecting surface (RS), which is a partially-reflecting surface that allows some light to pass through and reflects some light. The reflected light 74 passes through a first lens group (Gr1) and a filter (FL), and a portion of the reflected light 74 (ordinary light 76) is reflected by an object (not shown). The ordinary light 76 passes again through the filter (FL) and the first lens group (Gr1). The ordinary light 76 then passes through the reflecting surface (RS), a second lens group (Gr2), and falls on an imaging surface (IS) as an image 78.

As can be seen in FIG. 8, some of the reflected light 74 is reflected as an extraordinary component 82 from one or more lens surfaces 80 and reaches the imaging surface (IS) as a ghost 84 before the reflected light 74 reaches the object to be imaged. This situation causes ghosts in the image, which are typically detrimental. The ghosting effect is particularly great when the reflectance of the object being imaged is low.

SUMMARY OF THE INVENTION

The present invention is a new and advantageous image forming optical system which minimizes the effects of ghosting caused by extraordinary light which is reflected from one or more lens surfaces and falls onto an imaging surface. One object of the present invention is to provide an improved image forming optical system. Another object of the present invention is to provide an image forming optical system which minimizes the effects of ghosting even when illuminating light is introduced at an intermediate point of the image forming optical system.

The above-mentioned objects are achieved by embodiments of the present image forming optical system having the structures described hereinafter. An image forming optical system according to a first aspect of the invention illuminates an object to be imaged with illuminating light which is introduced at an intermediate point of the image forming optical system. Means for introducing illuminating light may include, but is not limited to, a reflecting surface disposed within the image forming optical system for reflecting illuminating light, emitted by an external light source, toward the object to be imaged. The reflecting surface may be a mirror which reflects some light components while allowing other light components to pass therethrough. When the image forming optical system is divided into, from an object side, a front lens unit and a rear lens unit at a point where the illuminating light is introduced, the illuminating light passing through the rear lens unit, with the light source image on a diaphragm surface as an object point and with a given surface of the front lens unit as a reflecting surface, satisfies the following condition on an imaging surface of the entire image forming optical system:

$$\frac{Y_{ref}}{Y_{max}} \geq 1.0$$

wherein $Y_{ref}$ is a maximum luminous flux radius on the imaging surface of the entire image forming optical system of the illuminating light passing through the rear lens unit; and $Y_{max}$ is a maximum image radius.

An image forming optical system according to a second aspect of the invention is an image forming optical system which illuminates an object to be imaged with illuminating light that is introduced at an intermediate point of the image forming optical system. When the image forming optical system is divided into, from an object side, a front lens unit and a rear lens unit at a point where the illuminating light is introduced, a back focal length of the optical system, in which the light source image on a diaphragm surface is an object point, a given surface of the front lens unit is a reflecting surface, and a last surface of the rear lens unit is included, satisfies the following condition:

$$-20.0 < \frac{f_{bref}}{f_{all}} < 0.5$$

wherein $f_{bref}$ is the back focal length of the image forming optical system; and $f_{all}$ is an overall focal length of the image forming optical system.

A positive back focal length indicates a focal point which is on the imaging surface side of the last surface of the rear lens unit and a negative back focal length indicates a focal point which is on the object side of the last surface of the rear lens unit.

BRIEF DESCRIPTION OF THE DRAWINGS

Other advantages and features of the invention will become more apparent with reference to the following detailed description of the presently preferred embodiment thereof in connection with the accompanying drawings, wherein like reference numerals have been applied to like elements, in which:

FIG. 5 is a lens construction diagram of a third embodiment of the present invention;

FIG. 6(a) is a diagram of spherical aberration and sine condition in the third embodiment of the present invention;

FIG. 6(b) is a diagram of astigmatism in the third embodiment of the present invention;

FIG. 6(c) is a diagram of distortion in the third embodiment of the present invention;

DESCRIPTION OF THE PREFERRED EMBODIMENTS

Figure 1:
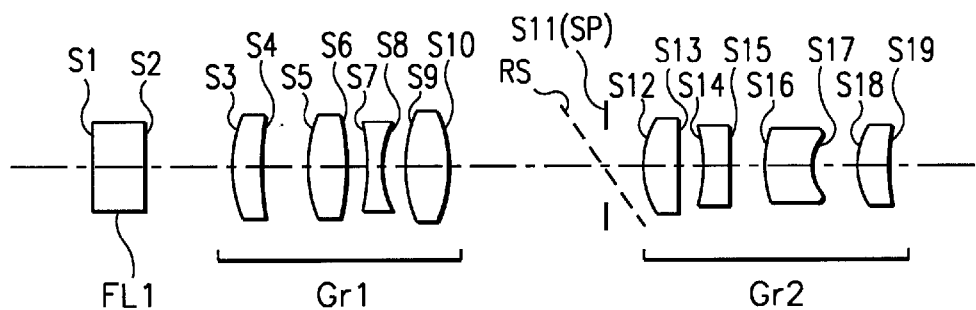
FIG. 1 is a lens construction diagram of a first embodiment of the present invention.
Figure 3:
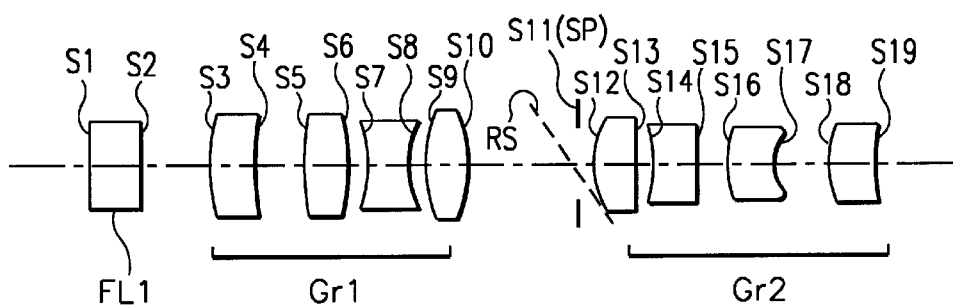
FIG. 3 is a lens construction diagram of a second embodiment of the present invention.

Hereinafter, image forming optical systems embodying the present invention will be described with reference to the drawings. FIGS. 1, 3, and 5 show the lens constructions of image forming optical systems according to first, second, and third embodiments, respectively. In these figures, the surfaces designated Si (i=1,2,3, . . . ) are i-th surfaces counted from the side of the object to be imaged. The first, second, and third embodiments are image forming optical systems comprising, from the object side, a filter (FL1), a front lens unit (Gr1), a diaphragm (SP) and a rear lens unit (Gr2). Additionally, the third embodiment (FIG. 5) comprises a filter (FL2) on the image side of the rear lens unit (Gr2). The object to be imaged is illuminated with illuminating light introduced at an intermediate point of the image forming optical system, i.e., at a point which is between the front lens unit (Gr1) and the rear lens unit (Gr2). Means for introducing illuminating light may include, but is not limited to, a reflecting surface (RS) disposed within the image forming optical system for reflecting illuminating light, emitted by an external light source, toward the object being imaged. In the embodiments disclosed herein, the reflecting surface (RS) is a mirror which reflects illuminating light from an external light source toward the object being imaged while light which is reflected by the object passes through the reflecting surface. In the first and second embodiments, the front lens unit (Gr1) comprises, from the object side, a positive meniscus lens element which is convex to the object side, a bi-convex positive lens element, a bi-concave negative lens element, and another bi-convex positive lens element. The rear lens unit (Gr2) comprises, from the object side, a bi-convex positive lens element, a biconcave negative lens element, a negative meniscus lens element which is concave to the image side, and a positive meniscus lens element which is convex to the object side. In the third embodiment, the front lens unit (GR1) comprises, from the object side, a positive meniscus lens element which is convex to the object side, a negative meniscus lens element which is concave to the image side, and another positive meniscus lens element which is convex to the object side. The rear lens unit comprises, from the object side, a negative meniscus lens element which is concave to the image side, a bi-convex positive lens element, another negative meniscus lens element which is concave to the object side; a biconcave negative lens element cemented to a bi-convex positive lens element, a negative meniscus lens element which is concave to the image side, and a positive meniscus lens element which is convex to the object side.

According to the first, second, and third embodiments of the present invention, when the image forming optical system is divided into, from the object side, a front lens unit (Gr1) and a rear lens unit (Gr2) at a point where the illuminating light is introduced, the illuminating light passing through the rear lens unit (Gr2), with a light source image on the surface of the diaphragm (SP) as an object point and with a given surface of the front lens unit (Gr1) as a reflecting surface, the present invention satisfies the following condition (1) on the imaging surface of the entire image forming optical system:

$$\frac{Y_{ref}}{Y_{max}} \geq 1.0 \quad (1)$$

wherein $Y_{ref}$ is a maximum luminous flux radius on the imaging surface of the entire image forming optical system of the illuminating light passing through the rear lens unit (Gr2); and $Y_{max}$ is a maximum image radius.

By employing a structure which introduces illuminating light at an intermediate point of the image forming optical system, as described above, part of the illuminating optical system can also be used as part of the image forming optical system, so that the overall size of the apparatus incorporating these optical systems can be reduced. However, since the illuminating optical system constitutes part of the image forming optical system, there is a possibility that the light reflected at one or more lens surfaces in the shared part of the optical system (corresponding to the front lens unit (Gr1) in the above-described embodiments) is directed toward the imaging surface. In this case, ghost light is directed onto the imaging surface, which can cause image quality deterioration. Ghost light falling on the imaging surface of the image forming optical system causes a phenomenon in the image called fogging and image quality deteriorates. When ghost light is imaged into a spot, there is also a possibility that the image information corresponding to the spot is missing. Normal coatings which are applied to the lens surfaces can enhance ghosts even though the reflectance of the lens surfaces is low.

Koehler illumination is typically adopted for the illuminating optical system in the present invention. In this case, a ray with a light source image on the diaphragm surface as the object point is considered. The image forming optical system is divided into, from the object side, a front lens unit (Gr1) and a rear lens unit (Gr2) at a point where illuminating light is introduced, and a light source image on the surface of the diaphragm (SP) is an object point. The position of the diaphragm (SP) is not limited to between the front lens unit (Gr1) and the rear lens unit (Gr2) but may be, for example, within the front lens unit (Gr1), on the object side of the front lens unit (Gr1), within the rear lens unit (Gr2), or on the imaging surface side of the rear lens unit (Gr2). A ray reflected at a reflecting surface in the front lens unit (Gr1) which passes through the rear lens unit (Gr2) is considered ghost light. When ghost light has a luminous flux radius which is larger than the maximum image radius of the object to be imaged, even though ghost light results in some fogging, the effect thereof on the image quality is small. Condition (1) defines the magnitude of this effect. When the lower limit of condition (1) is exceeded, the image quality deteriorates since the effect of fogging on the image is large, or a spot appears since image information is missing.

Moreover, the first, second, and third embodiments of the present invention are characterized in that when the image forming optical system is divided into, from the object side, a front lens unit (Gr1) and a rear lens unit (Gr2) at a point where illuminating light is introduced, the back focal length of the optical system, in which the light source image on the surface of the diaphragm (SP) is considered as the object point, a given surface of the front lens unit (Gr1) is the reflecting surface, and the last surface (S19) of the rear lens unit (Gr2) is included, satisfies the following condition (2):

$$-20.0 < \frac{f_{bref}}{f_{all}} < 0.5 \quad (2)$$

wherein $f_{bref}$ is the back focal length of the image forming optical system; and $f_{all}$ is an overall focal length of the image forming optical system.

A positive back focal length indicates a focal point which is on the imaging surface side of the last surface of the rear lens unit and a negative back focal length indicates a focal point which is on the object side of the last surface of the rear lens unit.

In order to reduce the effect of ghost light due to reflection at a lens surface in the part of the total optical system shared by the illuminating optical system and the image forming optical system (i.e., the front lens unit (Gr1)), a design in a form which includes the reflecting surface in the front lens unit (Gr1) to the last surface (S19) of the rear lens unit (Gr2) is necessary. Therefore, an optical system from the point where illuminating light is introduced to the last lens element of the rear lens unit (Gr2), with the given surface of the front lens unit (Gr1) as the reflecting surface, is considered. In this optical system, wherein the light source image on the surface of the diaphragm (SP) is considered as the object point, the effect of ghosts is large when the imaging position of the light source image is near the imaging position of the image forming optical system.

The condition (2) defines the relationship between the back focal length of the optical system, through which the illuminating light which is reflected at the given surface of the front lens unit (Gr1) passes, and the overall focal length of the image forming optical system. When the lower limit of the condition (2) is exceeded, optical power increases since it is necessary to reduce the overall focal length of the image forming optical system, resulting in difficult overall aberration correction. When the upper limit of the condition (2) is exceeded, since the effect of ghost light is large, fogging due to the ghost light at the imaging surface of the image forming optical system becomes more evident, which deteriorates image quality, or the ghost light is imaged into a spot so that image information is missing.

Further, in order to improve the performance of the image forming optical system so that the effect of ghost light is small, it is desirable to satisfy the following condition (3):

$$0.8 < \frac{f_{rea}}{f_{all}} < 3.5 \quad (3)$$

wherein $f_{rea}$ is the focal length of the rear lens unit (Gr2) of the image forming optical system; and $f_{all}$ is the overall focal length of the image forming optical system.

Condition (3) defines the desirable focal length of the rear lens unit (Gr2). When the upper limit of condition (3) is exceeded so that the optical power of the rear lens unit (Gr2) is decreased, even though ghost light is not easily condensed onto the imaging surface, aberrations caused by the front lens unit (Gr1) cannot be sufficiently corrected, causing the optical system to increase in size. When the lower limit of condition (3) is exceeded so that the optical power of the rear lens unit (Gr2) is increased, ghost light is easily condensed on the imaging surface.

The structures of the image forming optical systems embodying the present invention will more specifically be described with reference to construction data and graphic representations of aberrations. First, second, and third examples shown below correspond to the above-described first, second, and third embodiments, respectively. The lens constructions of the first, second, and third embodiments (FIGS. 1, 3, and 5) show the lens constructions of the corresponding first, second, and third examples.

In the construction data of each example, which is set forth in Tables 1–3, Si (i=1,2,3, . . . ) represents an i-th surface counted from the side of the object (object to be imaged), ri (i=1,2,3, . . . ) represents the radius of curvature of the surface Si, di (i=1,2,3, . . . ) represents an i-th axial distance counted from the object side, and Ni (i=1,2,3, . . . ) and vi (i=1,2,3, . . . ) represent i-th refractive index (Nd) and Abbe number (vd), to the d-line, of an i-th optical element counted from the object side. The object distance (the distance OD from the object to the first surface (S1)), the lateral magnification (β) and the effective F number (effective FNO) are also shown. The corresponding values of the conditions (1) to (3) of each embodiment are shown in Table 4.

Figure 2A:
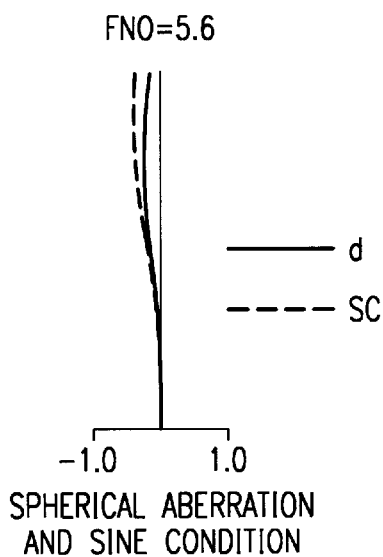
FIG. 2(a) is a diagram of spherical aberration and sine condition in the first embodiment of the present invention.
Figure 2B:
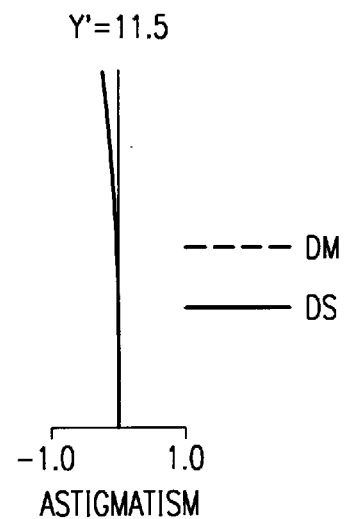
FIG. 2(b) is a diagram of astigmatism in the first embodiment of the present invention.
Figure 2C:
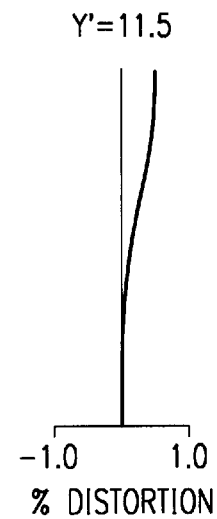
FIG. 2(c) is a diagram of distortion in the first embodiment of the present invention.
Figure 4A:
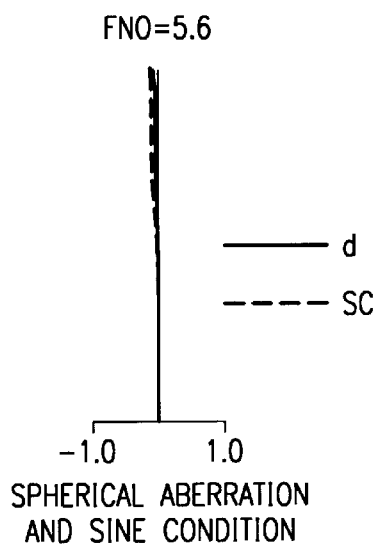
FIG. 4(a) is a diagram of spherical aberration and sine condition in the second embodiment of the present invention.
Figure 4B:
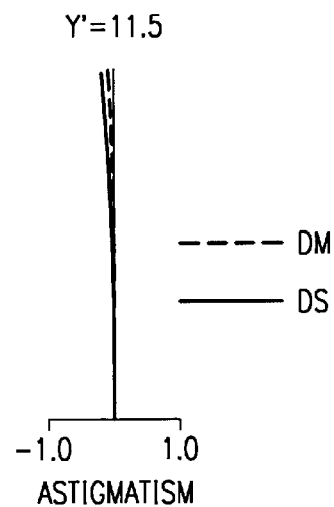
FIG. 4(b) is a diagram of astigmatism in the second embodiment of the present invention.
Figure 4C:
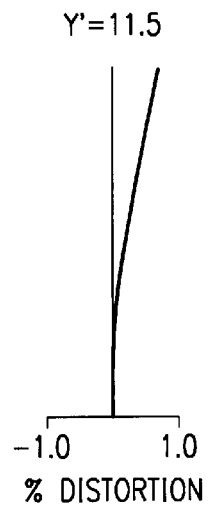
FIG. 4(c) is a diagram of distortion in the second embodiment of the present invention.
Figure 7:
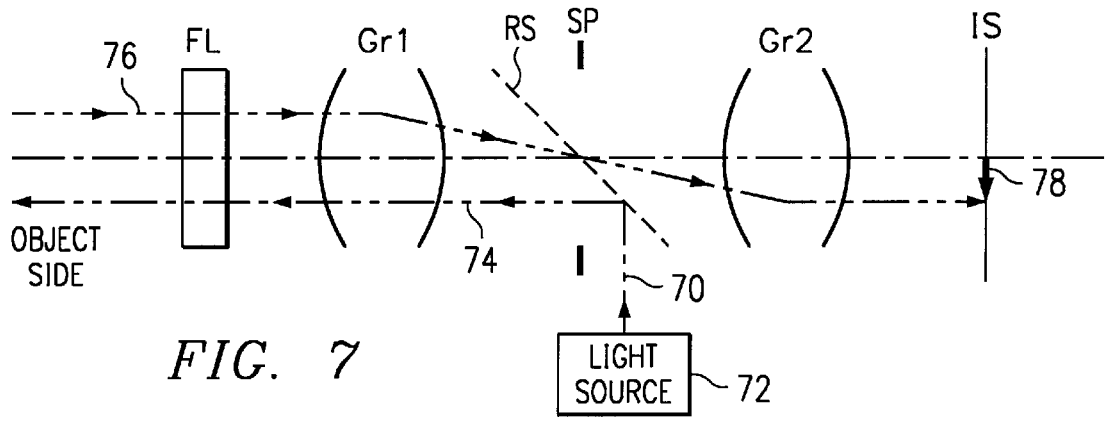
FIG. 7 is a lens construction diagram showing ordinary light in an illuminating optical system.
Figure 8:
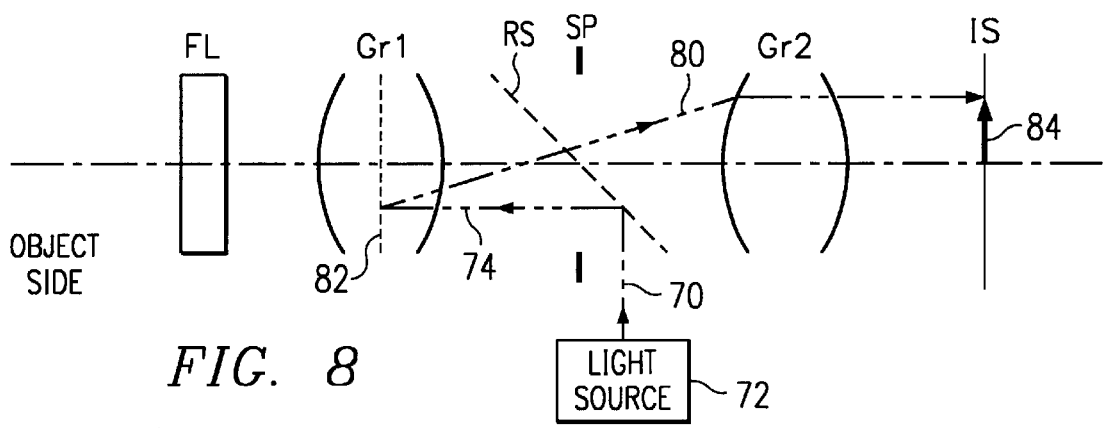
FIG. 8 is a lens construction diagram showing extraordinary light in an illuminating optical system.

FIGS. 2(a)–2(c) are graphical representations of aberrations of the first example corresponding to spherical aberration and sine condition, astigmatism, and distortion, respectively. FIGS. 4(a)–4(c) are graphical representations of aberrations of the second example corresponding to spherical aberration and sine condition, astigmatism, and distortion, respectively. FIGS. 6(a)–6(c) are graphical representations of aberrations of the third example corresponding to spherical aberration and sine condition, astigmatism, and distortion, respectively. In these figures, Y' is the image height and the aberrations are shown for a finite-distanced object. In the graphical representations of spherical aberration, the solid line (d) represents spherical aberration to the d-line, and the broken line (SC) represents sine condition. In the graphical representations of astigmatism, the broken line (DM) and the solid line (DS) represent astigmatisms on the meridional image plane and on the sagittal image plane, respectively.

As described above, according to the present invention, an image forming optical system can be realized in which the effect of ghosts is small even when illuminating light is introduced at an intermediate point of the image forming optical system. By using the image forming optical system according to the present invention, part of the illuminating optical system can be used also as part of the image forming optical system, so that the overall size of the apparatus incorporating these optical systems can be reduced.

Although the present invention has been described with reference to a presently preferred embodiment, it will be appreciated by those skilled in the art that various modifications, alternatives, variations, etc., may be made without departing from the spirit and scope of the invention as defined in the appended claims.

TABLE 1

Embodiment 1
OD = 24.5, β = −1.46, Effective FNO = 5.6

| SURFACE | RADIUS OF CURVATURE | AXIAL DISTANCE | REFRACTIVE INDEX | ABBE NUMBER |
|---|---|---|---|---|
| Filter (FL1) | | | | |
| S1 | r1 = ∞ | | | |
| | | d1 = 14.700 | N1 = 1.51680 | ν1 = 64.20 |
| S2 | r2 = ∞ | | | |
| | | d2 = 30.630 | | |
| Front Lens Unit (Gr1) | | | | |
| S3 | r3 = 64.766 | | | |
| | | d3 = 8.430 | N2 = 1.80518 | ν2 = 25.43 |
| S4 | r4 = 122.509 | | | |
| | | d4 = 15.920 | | |
| S5 | r5 = 75.500 | | | |
| | | d5 = 11.220 | N3 = 1.49310 | ν3 = 83.58 |
| S6 | r6 = −80.646 | | | |
| | | d6 = 7.120 | | |
| S7 | r7 = −61.255 | | | |
| | | d7 = 4.080 | N4 = 1.68150 | ν4 = 36.64 |
| S8 | r8 = 34.436 | | | |
| | | d8 = 7.070 | | |
| S9 | r9 = 47.754 | | | |
| | | d9 = 13.920 | N5 = 1.49310 | ν5 = 83.58 |
| S10 | r10 = −46.737 | | | |
| | | d10 = 53.090 | | |
| Diaphragm (SP) | | | | |
| S11 | r11 = ∞ | | | |
| | | d11 = 12.250 | | |
| Rear Lens Unit (Gr2) | | | | |
| S12 | r12 = 30.315 | | | |
| | | d12 = 11.400 | N6 = 1.49310 | ν6 = 83.58 |
| S13 | r13 = −544.363 | | | |
| | | d13 = 8.370 | | |
| S14 | r14 = −46.087 | | | |
| | | d14 = 8.290 | N7 = 1.48749 | ν7 = 70.44 |
| S15 | r15 = 267.890 | | | |
| | | d15 = 12.050 | | |
| S16 | r16 = 48.309 | | | |
| | | d16 = 15.520 | N8 = 1.68150 | ν8 = 36.64 |
| S17 | r17 = 18.147 | | | |
| | | d17 = 15.200 | | |
| S18 | r18 = 34.123 | | | |
| | | d18 = 9.040 | N9 = 1.75450 | ν9 = 51.57 |
| S19 | r19 = 109.157 | | | |

TABLE 2

Embodiment 2
OD = 23.8, β = −1.45, Effective FNO = 5.6

| SURFACE | RADIUS OF CURVATURE | AXIAL DISTANCE | REFRACTIVE INDEX | ABBE NUMBER |
|---|---|---|---|---|
| Filter (FL1) | | | | |
| S1 | r1 = ∞ | | | |
| | | d1 = 14.700 | N1 = 1.51680 | ν1 = 64.20 |
| S2 | r2 = ∞ | | | |
| | | d2 = 24.100 | | |
| Front Lens Unit (Gr1) | | | | |
| S3 | r3 = 58.480 | | | |
| | | d3 = 15.070 | N2 = 1.83350 | ν2 = 21.00 |
| S4 | r4 = 106.972 | | | |
| | | d4 = 16.570 | | |
| S5 | r5 = 95.755 | | | |

TABLE 2-continued

Embodiment 2
OD = 23.8, β = −1.45, Effective FNO = 5.6

| SURFACE | RADIUS OF CURVATURE | AXIAL DISTANCE | REFRACTIVE INDEX | ABBE NUMBER |
|---|---|---|---|---|
| S6 | r6 = −76.847 | d5 = 15.070 | N3 = 1.61950 | ν3 = 43.14 |
| S7 | r7 = −41.377 | d6 = 5.590 | | |
| S8 | r8 = 36.161 | d7 = 15.070 | N4 = 1.68300 | ν4 = 31.52 |
| S9 | r9 = 47.149 | d8 = 5.490 | | |
| S10 | r10 = −38.961 | d9 = 13.400 | N5 = 1.49310 | ν5 = 83.58 |
| Diaphragm (SP) | | d10 = 36.630 | | |
| S11 | r11 = ∞ | d11 = 5.160 | | |
| Rear Lens Unit (Gr2) | | | | |
| S12 | r12 = 32.615 | d12 = 14.040 | N6 = 1.49310 | ν6 = 83.58 |
| S13 | r13 = −230.313 | d13 = 5.880 | | |
| S14 | r14 = −47.123 | d14 = 15.100 | N7 = 1.48749 | ν7 = 70.44 |
| S15 | r15 = 10366.992 | d15 = 10.210 | | |
| S16 | r16 = 50.044 | d16 = 15.100 | N8 = 1.75450 | ν8 = 51.57 |
| S17 | r17 = 19.596 | d17 = 17.660 | | |
| S18 | r18 = 38.135 | d18 = 15.100 | N9 = 1.85026 | ν9 = 32.15 |
| S19 | r19 = 80.483 | | | |

TABLE 3

Embodiment 3
OD = 50.8, β = −0.683, Effective FNO = 5.0

| SURFACE | RADIUS OF CURVATURE | AXIAL DISTANCE | REFRACTIVE INDEX | ABBE NUMBER |
|---|---|---|---|---|
| Filter (FL1) | | | | |
| S1 | r1 = ∞ | d1 = 0.800 | N1 = 1.51680 | ν1 = 64.20 |
| S2 | r2 = ∞ | d2 = 48.770 | | |
| Front Lens Unit (Gr1) | | | | |
| S3 | r3 = 200.000 | d3 = 20.000 | N2 = 1.83350 | ν2 = 21.00 |
| S4 | r4 = 210.289 | d4 = 83.030 | | |
| S5 | r5 = 35.111 | d5 = 1.500 | N3 = 1.75000 | ν3 = 25.14 |
| S6 | r6 = 27.990 | d6 = 1.830 | | |
| S7 | r7 = 28.000 | d7 = 4.570 | N4 = 1.77250 | ν4 = 49.77 |
| S8 | r8 = 40.000 | d8 = 32.930 | | |
| Diaphragm (SP) | | | | |
| S9 | r9 = ∞ | d9 = 3.000 | | |
| Rear Lens Unit (Gr2) | | | | |
| S10 | r10 = 73.924 | d10 = 1.980 | N5 = 1.64769 | ν5 = 31.23 |

TABLE 3-continued

Embodiment 3
OD = 50.8, β = −0.683, Effective FNO = 5.0

| SURFACE | RADIUS OF CURVATURE | AXIAL DISTANCE | REFRACTIVE INDEX | ABBE NUMBER |
|---|---|---|---|---|
| S11 | r11 = 37.555 | | | |
| | | d11 = 1.470 | | |
| S12 | r12 = 43.302 | | | |
| | | d12 = 7.690 | N6 = 1.75450 | v6 = 51.57 |
| S13 | r13 = −362.783 | | | |
| | | d13 = 5.400 | | |
| S14 | r14 = −22.877 | | | |
| | | d14 = 11.060 | N7 = 1.49310 | v7 = 83.58 |
| S15 | r15 = −27.459 | | | |
| | | d15 = 27.670 | | |
| S16 | r16 = −266.758 | | | |
| | | d16 = 10.000 | N8 = 1.66446 | v8 = 35.84 |
| S17 | r17 = 87.111 | | | |
| | | d17 = 15.000 | N9 = 1.80500 | v9 = 40.97 |
| S18 | r18 = −201.489 | | | |
| | | d18 = 0.100 | | |
| S19 | r19 = 74.908 | | | |
| | | d19 = 1.500 | N10 = 1.59270 | v10 = 35.45 |
| S20 | r20 = 39.946 | | | |
| | | d20 = 63.570 | | |
| S21 | r21 = 43.762 | | | |
| | | d21 = 20.000 | N11 = 1.75450 | v11 = 51.57 |
| S22 | r22 = 44.123 | | | |
| | | d22 = 3.839 | | |
| Filter (FL2) | | | | |
| S23 | r23 = ∞ | | | |
| | | d23 = 20.000 | N12 = 1.51680 | v12 = 64.20 |
| S24 | r24 = ∞ | | | |

TABLE 4

| | Condition (1) | | Condition (2) | | Condition (3) |
|---|---|---|---|---|---|
| Emb | Reflection Surface | $Y_{ref}/Y_{max}$ | Reflection Surface | $f_{bref}/f_{all}$ | $f_{rea}/f_{all}$ |
| 1 | S3 | 1.20 | S3 | −3.37 | 1.58 |
| | S4 | 1.45 | S4 | −1.26 | |
| | S5 | 1.41 | S5 | −1.40 | |
| | S6 | 1.11 | S6 | −7.21 | |
| | S7 | 1.17 | S7 | −4.37 | |
| | S8 | 1.35 | S8 | −1.73 | |
| | S9 | 1.38 | S9 | −1.54 | |
| | S10 | 1.29 | S10 | −2.18 | |
| 2 | S3 | 1.18 | S3 | −3.07 | 1.85 |
| | S4 | 1.27 | S4 | −0.91 | |
| | S5 | 1.20 | S5 | −0.86 | |
| | S6 | 1.15 | S6 | −3.56 | |
| | S7 | 1.21 | S7 | −2.58 | |
| | S8 | 1.41 | S8 | −1.25 | |
| | S9 | 1.44 | S9 | −1.17 | |
| | S10 | 1.36 | S10 | −1.47 | |
| 3 | S3 | 1.04 | S3 | −1.30 | 1.12 |
| | S4 | 1.03 | S4 | −1.97 | |
| | S5 | 1.02 | S5 | −2.00 | |
| | S6 | 1.03 | S6 | −1.83 | |
| | S7 | 1.07 | S7 | −0.79 | |
| | S8 | 1.05 | S8 | −1.14 | |

What is claimed is:

1. An image forming optical apparatus comprising:

an image forming optical system having, from an object side of the image forming optical system, a front lens unit having at least one lens surface, a rear lens unit, and an imaging surface, the image forming optical system further having a diaphragm; and means for introducing illumination light into said image forming optical system, the illumination light being introduced between the front lens unit and the rear lens unit, the illumination light having an ordinary illumination light component for illuminating an object to be imaged via the front lens unit, wherein the ordinary illumination light component reaches the imaging surface via the front lens unit and the rear lens unit, and an extraordinary illumination light component, which is reflected from the at least one lens surface of the front lens unit without illuminating the object to be imaged, wherein the extraordinary illumination light component reaches the imaging surface via the rear lens unit, wherein said image forming optical system satisfies a condition:

$$\frac{Y_{ref}}{Y_{max}} \geq 1.0$$

wherein $Y_{ref}$ is a maximum luminous flux radius of illuminating light in its entirety passing through said rear lens unit and onto said imaging surface of said image forming optical system; and $Y_{max}$ is a maximum image radius of said object to be imaged.

2. An image forming optical apparatus, as claimed in claim 1, wherein said diaphragm is disposed between said front lens unit and said rear lens unit.

3. An image forming optical apparatus, as claimed in claim 1, wherein said means for introducing illuminating light into said image forming optical system comprises a mirror for reflecting said illuminating light from a light source which is external to said image forming optical system toward an object to be imaged.

4. An image forming optical apparatus, as claimed in claim 1, further comprising an optical filter disposed on an object side of said front lens unit.

5. An image forming optical apparatus comprising:

an image forming optical system having, from an object side of the image forming optical system, a front lens unit having at least one lens surface, a rear lens unit, and an imaging surface, the image forming optical system further having a diaphragm; and means for introducing illumination light into said image forming optical system, the illumination light being introduced between the front lens unit and the rear lens unit, the illumination light having an ordinary illumination light component for illuminating an object to be imaged via the front lens unit, wherein the ordinary illumination light component reaches the imaging surface via the front lens unit and the rear lens unit, and an extraordinary illumination light component, which is reflected from the at least one lens surface of the front lens unit without illuminating the object to be imaged, wherein the extraordinary illumination light component reaches the imaging surface via the rear lens unit, wherein said image forming optical system satisfies a condition:

$$-20.0 < \frac{f_{bref}}{f_{all}} < 0.5$$

wherein $f_{bref}$ is a back focal length of said image forming optical system; and $f_{all}$ is an overall focal length of said image forming optical system.

6. An image forming optical apparatus, as claimed in claim 5, wherein said diaphragm is disposed between said front lens unit and said rear lens unit.

7. An image forming optical apparatus, as claimed in claim 5, wherein said means for introducing illuminating light into said image forming optical system comprises a mirror for reflecting said illuminating light from a light source which is external to said image forming optical system toward an object to be imaged.

8. An image forming optical apparatus, as claimed in claim 5, further comprising an optical filter disposed on an object side of said front lens unit.

9. An image forming optical apparatus comprising:

an image forming optical system having, from an object side of the image forming optical system, a front lens unit having at least one lens surface, a rear lens unit, and an imaging surface, the image forming optical system further having a diaphragm; and means for introducing illumination light into said image forming optical system, the illumination light being introduced between the front lens unit and the rear lens unit, the illumination light having an ordinary illumination light component for illuminating an object to be imaged via the front lens unit, wherein the ordinary illumination light component reaches the imaging surface via the front lens unit and the rear lens unit, and an extraordinary illumination light component, which is reflected from the at least one lens surface of the front lens unit without illuminating the object to be imaged, wherein the extraordinary illumination light component reaches the imaging surface via the rear lens unit, wherein said image forming optical system satisfies a condition:

$$0.8 < \frac{f_{rea}}{f_{all}} < 3.5$$

wherein $f_{rea}$ is a focal length of said rear lens unit of said image forming optical system; and $f_{all}$ is an overall focal length of said image forming optical system.

10. An image forming optical apparatus, as claimed in claim 9, wherein said diaphragm is disposed between said front lens unit and said rear lens unit.

11. An image forming optical apparatus, as claimed in claim 9, wherein said means for introducing illuminating light into said image forming optical system comprises a mirror for reflecting said illuminating light from a light source which is external to said image forming optical system toward an object to be imaged.

12. An image forming optical apparatus, as claimed in claim 9, further comprising an optical filter disposed on an object side of said front lens unit.

* * * * *